Aug. 16, 1949.    H. F. MacMILLIN    2,479,383
TURRET INJECTION MACHINE
Filed July 13, 1944    3 Sheets-Sheet 1

INVENTOR
HOWARD F. MacMILLIN
BY
Toulmin + Toulmin
ATTORNEYS

INVENTOR
HOWARD F. MacMILLIN
BY
Toulmin + Toulmin
ATTORNEYS

Aug. 16, 1949.  H. F. MacMILLIN  2,479,383
TURRET INJECTION MACHINE
Filed July 13, 1944  3 Sheets-Sheet 3
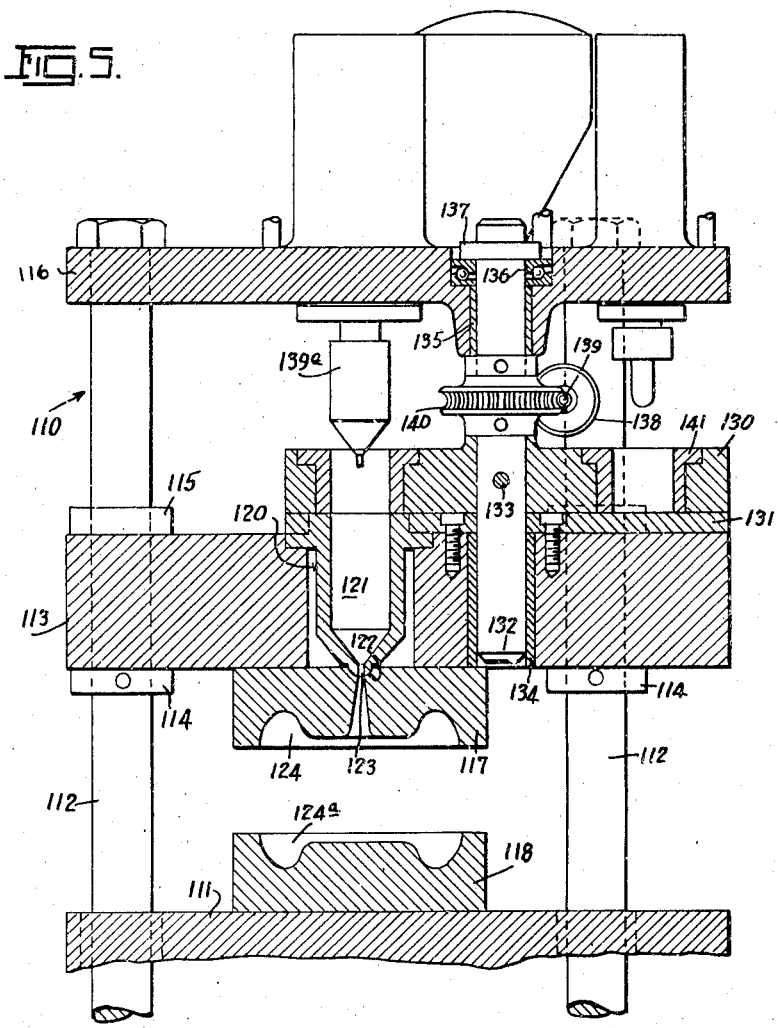
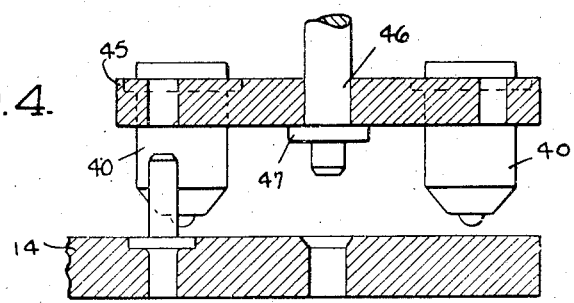
INVENTOR
HOWARD F. MacMILLIN,
BY
Toulmin + Toulmin
ATTORNEYS Patented Aug. 16, 1949

2,479,383

UNITED STATES PATENT OFFICE 2,479,383

TURRET INJECTION MACHINE

Howard F. MacMillin, Mount Gilead, Ohio, assignor to H-P-M Development Corporation, Wilmington, Del., a corporation of Delaware Original application April 15, 1943, Serial No. 483,125. Divided and this application July 13, 1944, Serial No. 544,711

14 Claims. (Cl. 18—30)

This application is a division of Application Ser. No. 483,125, filed Apr. 15, 1943, now abandoned.

This invention relates to plastic injection machines and particularly to a machine having a high productive capacity.

An object of the invention is to provide a plastic injection machine that is constructed and arranged for simultaneously performing a number of operations that are required to place plastic material in condition for an injection molding operation and to inject the plastic material into a suitable mold.

Another object of the invention is to provide a method and apparatus for injection molding plastic materials of either the thermosetting or thermoplastic types on a continuous and high production cycle of operation.

Another object of the invention is to provide a method and apparatus for working plastic materials in granular or powdered form to place them in condition for injection molding and to perform the various operations on the plastic material simultaneously so that each injection operation to form an article will be simultaneously accompanied by preconditioning operations on other batches of plastic material, whereby a sequential step process of preparing plastic material for injection and the injection thereof is accomplished.

Another object of the invention is to provide a method and apparatus for molding plastic materials wherein the heating of the plastic material is accomplished rapidly and uniformly by the use of high frequency electrostatic heating.

Another object of the invention is to provide a method and apparatus for injection molding thermosetting plastic materials which includes the step of heating the plastic material to a temperature that initiates polymerization of the material and then transferring the material into an injection molding station for ejecting the thermosetting material that is polymerizing from the injection chamber into the mold before polymerization of the resin is complete.

Another object of the invention is to provide a method and apparatus for injection molding thermosetting resins in accordance with the foregoing object wherein the polymerization of the resin is completed in a mold that is heated for completing the polymerization of the material, or the polymerization is completed in the mold by use of the heat developed in the material due to the exothermic reaction of the material.

Another object of the invention is to provide a turret type injection press for accomplishing the foregoing objects.

Further objects and advantages will become apparent from the drawings and the following description.

In the drawings:

Figure 4 is a cross sectional view of a portion of the injection press taken along line 4—4 of Figure 3 showing the guide pin for aligning the injection cylinder with the mold.

Figure 5 is a vertical cross sectional view of a slightly modied form of press structure for accomplishing the purposes of this invention.

Figure 1:
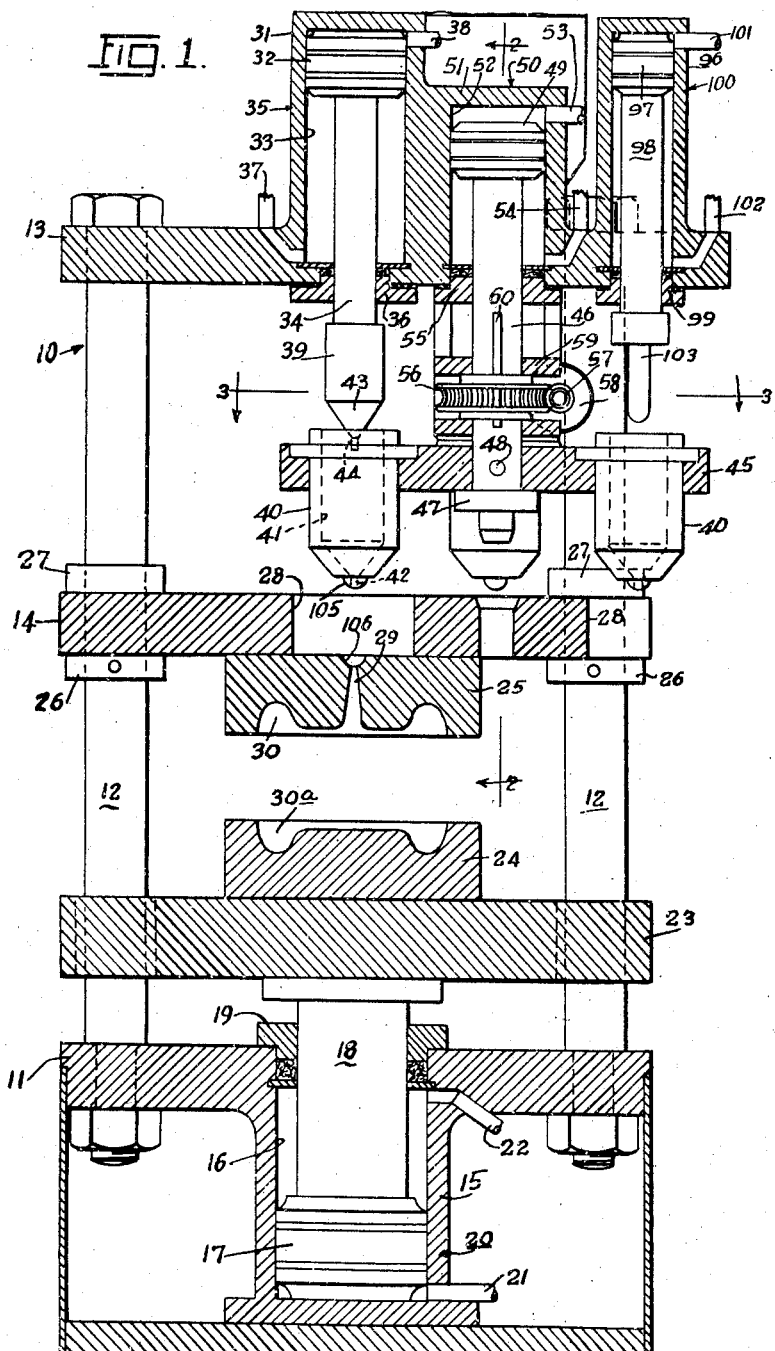
Figure 1 is a vertical cross sectional view of a turret injection press for carrying out the method of injection molding of this invention.
Figure 2:
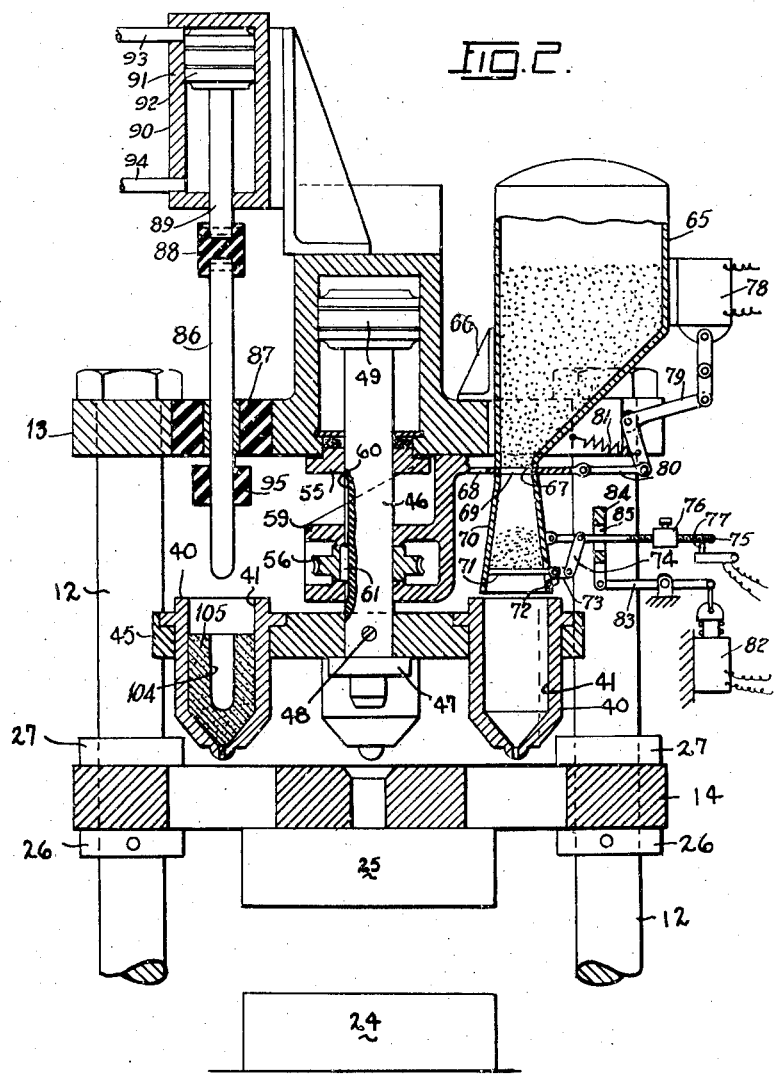
Figure 2 is a vertical cross sectional view of a portion of the press taken along line 2—2 of Figure 1.

In this invention the press 10 shown in Figures 1 and 2 consists of a bed 11 having strain rods 12 extending upwardly therefrom to support the head 13 of the press and an intermediate stationary head 14.

The bed 11 of the press has a cylinder 15 extending downwardly therefrom that has a bore 16 for receiving a piston 17 having a plunger 18 extending therefrom. A seal member 19 is provided between the plunger 18 and the bore 16 of the cylinder 15, whereby the bore 16 provides a chamber in which the piston 17 can reciprocate and thereby provide a hydraulic motor 20. Fluid conducting conduits 21 and 22 are provided at opposite ends of the cylinder 15 to complete reciprocation of the piston 17 therein according to the direction of flow of fluid under pressure in the respective conduits 21 and 22 from a suitable source of supply and under control of suitable flow control members.

A movable platen 23 is carried upon the plunger 18 and secured thereto in any suitable manner. The strain rods 12 extend through the platen 23 for guiding the same in its reciprocation within the press as caused by movement of the plunger 18. The movable platen 23 carries a die or mold member 24 that is adapted to engage and cooperate with a stationary die or mold member 25 to form a mold cavity therebetween in conventional manner.

The stationary die 25 is carried upon the intermediate stationary head 14 that is supported by the strain rods 12 between the collars 26 positioned beneath the intermediate head 14 and the collars 27 positioned above the intermediate head 14. The intermediate head 14 is provided with openings 28 therein to receive reciprocable injection cylinders in a manner that will be hereinafter described. One of the openings 28 is in alignment with the sprue opening 29 in the stationary die 25 that conducts plastic material into the die cavity 30 provided in the upper die 25 and the co-operating die cavity 30a provided in the lower die 24.

The upper head 13 carries a main hydraulic motor 35 which is provided for ejecting plastic material from an injection cylinder in a manner hereinafter described. The hydraulic motor 35 consists of a cylinder 31 having a piston 32 therein adapted to reciprocate within the cylinder bore 33, the piston 32 having a plunger 34 that extends through a seal member 36 provided in the end of the cylinder bore 33. The cylinder 31 is provided with fluid conducting conduits 37 and 38 at opposite ends thereof for introducing fluid under pressure to reciprocate the piston 32 and thus reciprocate the plunger 34 in accordance with the delivery of fluid under pressure to the respective conduits 37 and 38 which fluid is delivered from a suitable source and under control of suitable valves to regulate the flow thereof to the conduits 37 and 38.

The plunger 34 may be provided with an enlarged head 39 that forms an injection plunger adapted to enter injection cylinders 40 carried upon a turret 45.

The turret 45 is provided with a plurality of identical injection cylinders 40, each of which is adapted to receive the injection plunger 39 to permit ejection of plastic material from the injection cylinders 40.

The injection cylinders 40 are provided with an internal bore 41 that tapers at the front end thereof to a nozzle orifice 42. The injection plunger 39 may have a tapered forward portion 43 provided with an extending tip 44 that is adapted to enter the nozzle orifice 42 so that all of the plastic material in the injection cylinder 40 can be ejected from the cylinder bore 41 on each stroke of the injection plunger 39 into the cylinder bore 41 if desired.

It will be noted that the hydraulic motor 35 for ejecting plastic material from the injection cylinder 40 and the hydraulic motor 20 for closing the dies or molds 24 and 25 are on the axial center line of the press 10 so that the principal and largest forces required in the injection molding of the plastic material are developed on the axial center line of the press and thereby the force is evenly distributed between the four corner strain rods of the press 10.

The turret table 45 is carried upon a plunger rod 46 and supported upon a collar 47 secured to the lower end of the plunger rod 46. The turret table 45 is prevented from rotation upon the plunger rod 46 by means of a pin 48.

The upper end of the plunger rod 46 carries a piston 49 that reciprocates within a cylinder 51 having a cylinder bore 52 to thereby provide a hydraulic motor 50 for lifting and lowering the turret table 45. Suitable fluid conducting conduits 53 and 54 are provided at opposite ends of the cylinder 51 to conduct fluid under pressure to the cylinder 51 as controlled by suitable control valves for reciprocating the piston 49 in the cylinder bore 52. A packing gland 55 is provided for sealing the lower end of the cylinder bore 52.

The plunger rod 46 carries a worm wheel 56 thereon that is engaged by a worm 57 carried upon the driven shaft of an electric motor 58 that is mounted on a bracket 59 extending from the upper head 13 of the press 10. The worm wheel 56 is slidably positioned upon the plunger 46 so that the plunger can reciprocate through the worm wheel 56 but the wheel will not rotate relative to the plunger 46 due to the longitudinally extending keyway 60 that is engaged by a key 61 carried by the worm wheel 56.

Figure 3:
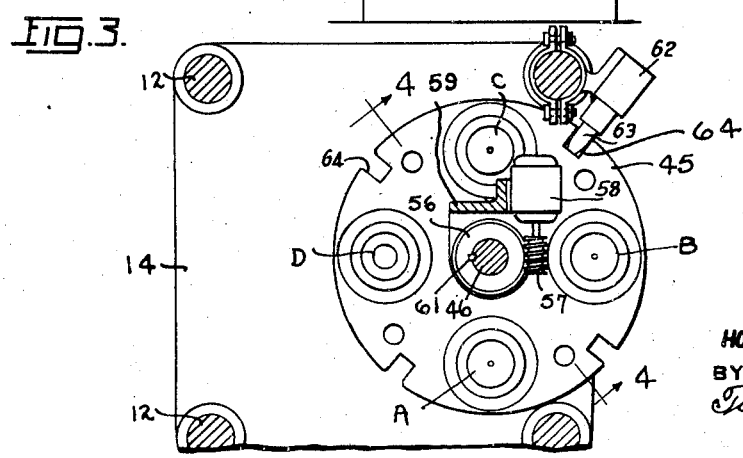
Figure 3 is a horizontal cross sectional view of the injection press taken along line 3—3 of Figure 1.

The injection machine of this invention is constructed and arranged so that the usual independent operations of feeding granular plastic material to the injection cylinder, compressing the granular plastic material, heating the plastic material and ejecting the same from the injection cylinder can all be accomplished in individual and simultaneous operations so that each stroke of operation of the press will cause ejection of plastic material from an injection chamber and produce an article. As illustrated in Figure 3 the injection machine of this invention is provided with four stations, the turret therefor being provided with four injection cylinders 40 which are sequentially positioned by the turret at the loading station A, the compressing station B, the heating station C and the injection station D. The turret 45 is suitably indexed to place the injection cylinders at their various stations by means of the electric motor 58 that is controlled by suitable control mechanisms for starting and stopping the same when it is desired to index the turret 45. A turret locking mechanism 62 is provided with an electrically actuated pin 63 that engages slots or recesses 64 in the turret 45 to stop the indexing of the turret at the proper position, the locking mechanism 62 being actuated by suitable control mechanisms in response to the rotation of the turret 45.

The apparatus for charging each of the injection cylinders 40 when positioned in the loading station A preferably consists of an apparatus for charging a predetermined weight of granular plastic material into the injection cylinders so that all of the charge of granular material can be ejected from the injection cylinders upon each stroke of the injection plunger 39.

The loading mechanism consists of a hopper 65 that is suitably secured to the upper head 13, as by means of the brackets 66. The hopper 65 is provided with an opening 67 in the bottom wall thereof that is opened and closed by means of a gate 68 having an opening 69 therein that aligns with the opening 67 when the gate is in the open position as shown in Figure 2 to permit granular plastic material, or powdered material, to flow from the hopper 65 into the measuring chamber 70 of the loading mechanism.

The measuring chamber 70 is provided with a weighing apparatus that consists of a weighing platform 71 pivotally mounted upon the measuring chamber 70 by means of the pivot pin 72. A lever arm 73 extends from the weighing platform 71 and is engaged by a link 74 that has one end thereof engaging the weighing arm 75 that carried the weight 76. The weighing arm 75 engages an electric contact 77 that controls the electric circuit to the solenoid 78 that operates the gate 68 through means of the bellcrank 79 and the link 80 to close the same when the solenoid 78 is de-energized. A spring 81 aids in closing the gate 68.

In order to regulate the time when the weighing platform 71 will dump the weighed plastic charge thereon into an injection cylinder 40, a solenoid 82 is provided to actuate an arm 83 to permit an arm 84 to raise relatively to the weighing arm 75 so that a slot 85 in the arm 84 will permit vertical movement of the weighing arm 75 whereby the platform 71 can dump the charge into the injection cylinder 40.

When a charge of plastic is to be weighed the apparatus will be in position as shown in Figure 2 with the gate 68 open and with the arm 84 positioned with the upper edge of the slot spaced a slight distance from the upper edge of the weighing arm 75. When a predetermined weight of material has gathered on the platform 71 it will rotate downwardly to lift the arm 75 and break electric circuit through contact 77 and thus de-energize the solenoid 78 to permit the spring 81 to close the gate 68. The arm 75 can at this time rise only sufficiently to engage the upper edge of the slot 85 in the arm 84 whereby the weighed charge of plastic material upon the platform 71 will be held in the weighing chamber 70. When the controls are actuated to perform an injection operation by the plunger 39, the solenoid 82 will be energized to lift the arm 84 and thereby permit the weighed material on the platform 71 to drop into the injection cylinder 40.

The heating apparatus for heating the charge of plastic material in the injection cylinders 40 at the heating station C consists of an electrode 86 that is reciprocable within an insulating bushing 87 positioned within the upper head 13 of the press. The electrode 86 is secured to an insulating bushing or separator 88 that secures the electrode 86 to a plunger 89 extending from a hydraulic motor 90 that consists of a cylinder 91 and a piston 92. Suitable fluid conducting conduits 93 and 94 are provided for conducting fluid under pressure from a suitable source of supply to opposite ends of the cylinder 91 for reciprocating the piston 92 and thus reciprocating the electrode 86 within the injection cylinders 40. The electrode 86 is adapted to be positioned axially within an injection cylinder 40 during the cycle of operation of the machine and is positioned therein so that the forward end of the electrode 86 is positioned substantially the same distance from the forward end of the injection chamber 41 as the radial distance between the periphery of the electrode 86 and the inner periphery of the injection chamber 41. An insulating bushing 95 is adapted to retain alignment between the electrode 86 and the injection chamber 41 when the electrode is in position therein.

The electrode 86 is connected to one side of a source of high frequency current that is generated by any suitable apparatus such as a high frequency radio frequency generating mechanism. The frame of the injection press 10 is connected to a second terminal of the source of high frequency current so that a field of high frequency current is set up between the electrode 86 and the injection cylinder 40.

When speaking of high frequency current, high frequency field or high frequency in this application, the applicant is referring to that type of current of extremely high frequency that can be generated with the use of radio frequency apparatus that develops frequencies of 1,500,000 to 10,000,000 cycles and is not to be confused or compared with magnetic heating or induction heating. The use of high frequency current in creating a high frequency field in which the plastic material is placed causes the plastic material to be heated uniformly and rapidly throughout the entire mass of plastic material that is within the field of high frequency. This heating is actually accomplished in the plastic material itself and is not a result of any conductive heat. One of the explanations of the cause of this heating of plastic material is that the high frequency current produces deformation of the molecules of the plastic material at an extremely rapid rate. The deformation of the molecules of the material causes friction between them that results in the formation of heat to raise the temperature of the plastic material because the heat of friction cannot be dissipated at a greater rate than it is produced in the plastic material. As long as the surface of the electrodes are spaced uniformly from one another the plastic material between the electrodes will be heated uniformly throughout its entire mass so that relatively thick cross sections of plastic material can be heated in a very short period of time.

Therefore, when the electrode 86 is within the injection cylinder 40, these elements being connected to the power terminal of a source of high frequency current, there will be created an intense high frequency field between the elements that will result in high frequency electrostatic heating of the plastic material therebetween, the plastic material acting as the dielectric between the electrodes.

After the plastic material has been fed into the injection cylinders 40 at the loading station A and before the material is heated in the heating station C it is precompressed in the compressing station B.

The compressing station B consists of a hydraulic motor 100 having a cylinder 96 and a piston 97. The piston 97 carries a plunger 98 that extends from the cylinder 96 through a seal member 99. Fluid conducting conduits 101 and 102 are provided at opposite ends of the cylinder 96 for conducting fluid to opposite ends thereof and thus reciprocates the piston 97 and plunger 98 as controlled by suitable control valves for regulating the direction of flow of the fluid to the conduits 101 and 102 from a suitable source of fluid.

The plunger 98 carries a compressing or preforming plunger 103 that enters the injection cylinder 40 for compressing or preforming the granular plastic material therein that has been loaded at the loading station A. It may be preferable to have the plunger 103 form a depression or recess in the granular plastic material of the injection cylinder 40 in the manner shown in Figure 2 wherein a recess 104 is provided in a compressed charge of plastic material 105 so that the electrode 86 can enter the charge of plastic material without actually causing any movement of the material or requiring that the electrode be of sufficient size and strength to withstand the force of compressing the granular plastic material. However, it may be desirable in the interest of speed of operation of the press and economy of construction of the same to combine the heating station C and the compressing station B into a single station.

*Operation*

Assuming that the injection press 10 has operated a sufficient number of times to cause indexing of the turret 45 and filling of each of the injection cylinders 40 with a charge of granular plastic material, and assuming that the press is in a condition wherein the injection plunger 39 has just performed an injection operation and the turret 45 has just been retracted from the intermediate head 14, the completion of the retraction movement of the turret 45 will cause actuation of a control means to energize the turret locking mechanism 62 and the electric motor 58 to initiate indexing of the turret 45. The turret 45 will then index until the locking pin 63 of the locking mechanism 62 enters the next successive recess 64 thereby stopping the indexing of the turret and stopping the electric motor 58 either by cutting off the current to the same or by stalling the motor. With the turret in its newly indexed position the machine is in condition for performing an injection operation. However, before the injection operation is started the hydraulic motor 20 will be operated to close the movable die 24 upon the immovable die 25 and clamp the same together. Concomitant with this operation fluid is supplied to the hydraulic motor 50 to lower the turret 45 into position so that the nozzle 105 on the injection cylinder 40 engages the nozzle socket 106 in the stationary die 25 and seals thereon. A suitable interlock control can be provided to then actuate suitable valve mechanisms for directing fluid to the hydraulic motors 35, 90 and 100 to cause downward movement of the injection plunger 39, the electrode 86 and the performing or compressing plunger 103 to eject hot plastic material from the injection cylinder 40 at the station D, introduce the electrode 86 into the compressed charge of plastic material at the station C to heat the same and compress a fresh charge of plastic material at the station B.

When the hydraulic motors 35, 90 and 100 are energized the solenoid 82 can be energized to permit the weighed charge of granular plastic material on the platform 71 to fall into the injection cylinder at the station A. The four normal operations of a plastic injection machine are thus accomplished on this apparatus simultaneously so that each cycle of operation of the machine will take substantially less time than a single cycle of operation of a conventional plastic injection machine.

Upon completion of the ejection of plastic material from the injection cylinder at the station D the hydraulic motors 35, 50, 90 and 100 will be reversed to lift the injection plunger 39 from the injection cylinder 40 at the station D, to lift the electrode 86 from the injection cylinder at the station C, the plastic material at this station now being sufficiently heated to be in condition for injection molding, to lift the precompressing plunger 103 from the injection cylinder at the station B and raise the turret 45 to lift the injection cylinders 40 from the openings 28 in the intermediate head 14 to permit indexing thereof.

When the turret 45 reaches its uppermost position, a control will be actuated to energize the locking mechanism 62 and the motor 58 to index the turret for the next cycle of operation.

While a particular cycle of operation has just been described with regard to the machine shown in Figure 1, yet it is to be understood that certain operations of the machine could be combined at one station and be performed either simultaneously or in rapid sequence in order to reduce the number of stations on the press. As an example, precompressing and heating of the plastic material could be accomplished at one station simultaneously because the electrode enters the plastic material for heating with same and the plunger to which the electrode is attached could compress the plastic material while it is being heated. Also, it is an entirely practical consideration to feed a weighed or measured charge of plastic material at the station just prior to the entry of the heating electrode into the cylinder so that the feeding and subsequent compressing and heating could be accomplished in rapid sequence at a single station. Also, if the heating of the material would require approximately double the time required for injection and setting of the plastic material, two heating stations could be provided and feed the same from a common hopper by means of a two-way dump apparatus. This latter arrangement lends itself to the use of one source of high frequency, the power output of which could be alternately shifted between the heating chambers.

In Figure 5 there is shown a somewhat modified form of the invention wherein the press 110 is provided with a movable platen 111 guided upon the strain rods 112 and moved by means of a hydraulic motor in the same manner as heretofore described with regard to the apparatus shown in Figure 1. An intermediate stationary head 113 is carried upon the strain rods 112 between the lower and upper collars 114 and 115, respectively. An upper stationary head 116 is also carried upon the strain rods 112.

The intermediate stationary head 113 carries the stationary die 117 while the platen 111 carries a movable die 118 that co-operates with the stationary die 117 to form a mold cavity.

An injection cylinder 120 having an injection chamber 121 is positioned in the intermediate head 113 and suitably secured thereto, the injection cylinder 120 being positioned on the axial center line of the injection press 110. In this modification there is only one injection cylinder provided for the injection machine and it remains in its fixed position in the stationary head 113 during the operation of the machine, in contradistinction to the rotating injection cylinders described with regard to the apparatus shown in Figure 1. The injection cylinder 120 has an injection nozzle 122 having a nozzle orifice 123 that conducts plastic into the die cavity 124 of the die 117 and the co-operating die cavity 124a in the die 118.

A rotating turret 130 is positioned above a plate 131 carried upon the head 113 and in sliding engagement therewith. An axle shaft 132 is provided for the turret 130 that is non-rotatably secured thereto by means of the pin 133, the shaft 132 being bearinged in the bearing 134 in the head 113 and the bearing 135 in the upper head 116. A suitable anti-friction thrust bearing 136 is carried in the head 116 for supporting a collar or shoulder 137 provided on the turret axle shaft 132 to take the load of the turret 130 so that a light sliding contact can be maintained between the turret 130 and the plate 131.

The turret 130 is rotated by means of an electric motor 138 through means of a worm 139 on the drive shaft of the motor and a worm wheel 140 on the turret axle shaft 132, the worm wheel 140 being non-rotatably secured to the axle shaft 132. The turret 130 has a plurality of individual chambers 141 that are adapted to receive charges of granular plastic material. These chambers 141 are arranged so that they can assume the same station positions as previously referred to with regard to the apparatus shown in Figure 3 so that the plastic material in each of the chambers 141 can be worked upon. The feeding, heating and compressing apparatus of the press 110 is the same as that heretofore described with regard to Figures 1 and 2. Also, the functioning of these mechanisms is the same so that their detailed construction and operation need not be reiterated with regard to the contruction of the press 110.

*Operation of modified apparatus*

The principal difference in the operation of the press disclosed in Figure 5 is in the operation of the turret 130. It will be noted that the turret 130 is not reciprocable but is merely rotatable so that the charges of plastic material in the chambers 141 are successively brought over the stationary injection cylinder 120. The plate 131 forms the bottom wall of the chambers 141 to retain the plastic material in the chambers through the loading, compressing and heating stations A, B and C, respectively, and is provided with an opening at the injection station D in alignment with the injection cylinder 120 so that the injection plunger 139a can force the plastic material from the chamber 141 into the injection cylinder 120.

The stroke of the injection plunger 139a is somewhat longer than the stroke of the heating electrode and the precompressing plunger because this plunger is to move into the injection cylinder 120 wherein pressure is developed on the hot plastic material therein to force the same into the dies 117 and 118. Preferably there is little or no pressure developed in the chamber 141 in alignment with the injection cylinder 120 so as to prevent plasticized plastic from entering the crevice between the plate 131 and the turret 130.

The general cycle of operation of the press 110 of Figure 5 is the same as that herefore described with regard to the press shown in Figure 1 except that the reciprocation of the turret is omitted, it being apparent that the omission of this portion of the operation of the machine would not require any special changes in the general cycle of operation of the machine.

While the form of the apparatus disclosed and described herein constitutes a preferred form of the invention, yet it is to be understood that the apparatus is capable of substantial alteration without departing from the spirit of the invention, and that all such modifications as fall within the scope of the appended claims are intended to be included herein.

Having thus fully described my invention, what I claim as new and desire to secure by Letters Patent is:

1. An injection molding machine including, a movable platen carrying a die and having means for moving the platen, a stationary head, an intermediate stationary head disposed between said first mentioned head and said platen and carrying a die for co-operation with the die carried by the platen, a turret having a plurality of chambers therein, means rotatably supporting said turret between said stationary head and said intermediate head, means for moving said turret to sequentially position said chambers in operating relationship with the die carried upon the intermediate head, means for feeding individual charges of plastic material into said chambers, means for compressing plastic material in said chambers, means co-operating with said chambers to produce a field of high frequency therein to heat plastic material in the chambers, and means for ejecting plastic material from said chambers, said feeding, compressing, heating and ejecting means being positioned above said turret for co-operation with the chambers carried thereby.

2. An injection molding machine including, a movable platen carrying a die and having means for moving the platen, a stationary head, an intermediate stationary head disposed between said first mentioned head and said platen and carrying a die for co-operation with the die carried by the platen, a turret having a plurality of chambers therein, means rotatably supporting said turret between said stationary head and said intermediate head, means for moving said turret to sequentially position said chambers in operating relationship with the die carried upon the intermediate head, said chambers carried by said turret providing stations for feeding, compressing, heating and ejecting plastic material therefrom, said ejecting station being positioned substantially on the axial center line of the machine and said means rotatably supporting said turret being positioned off center of the machine, means for feeding individual charges of plastic material into said chambers, means for compressing plastic material in said chambers, means co-operating with said chambers to produce a field of high frequency therein to heat plastic material in the chambers, and means for ejecting plastic material from said chambers, said feeding, compressing, heating and ejecting means being positioned above said turret for co-operation with the chambers carried thereby.

3. An injection molding machine including, a movable platen carrying a die and having means for moving the platen, a stationary head, an intermediate stationary head disposed between said first mentioned head and said platen and carrying a die for co-operation with the die carried by the platen, a turret having a plurality of chambers therein, means rotatably supporting said turret between said stationary head and said intermediate head, means for rotating said turret to sequentially position said chambers in operating relationship with the die carried upon the intermediate head, means for reciprocating said turret to place the chambers into operating position relative to the die carried by the intermediate head and for withdrawing the same from operating relationship with the die to permit indexing of the turret, means for feeding a charge of plastic material to a chamber in the turret, means for compressing a charge of plastic material in a chamber, means for applying a field of high frequency current upon a compressed charge of plastic material in a chamber, and injection plunger means for completely ejecting a heated charge of plastic material from a chamber.

4. An injection molding machine including, a movable platen carrying a die and having means for moving the platen, a stationary head, an intermediate stationary head disposed between said first mentioned head and said platen and carrying a die for co-operation with the die carried by the platen, a turret having a plurality of chambers therein and positioned in slidable engagement with said intermediate head, an injection chamber in said intermediate head with which said chambers in said turret are aligned upon indexing thereof by means for indexing said turret, said intermediate head forming the bottom wall of said chambers in said turret, means for feeding a charge of plastic material into said chambers, means for compressing a charge of plastic material in said chambers, means for applying a field of high frequency current upon a compressed charge of plastic material in a chamber for raising the temperature thereof suitable for plastic injection, and injection plunger means for transferring a heated charge of plastic material from a chamber into said injection cylinder and ejecting the material from said cylinder.

5. An injection moulding machine including in combination, a stationary head for carrying a die member, a movable platen disposed beneath said stationary head for carrying a complementary die member and having means operably connected thereto for moving the platen relative to said stationary head, a second stationary head positioned above said first mentioned stationary head, a turret positioned between said stationary heads having a plurality of chambers therein, and a plurality of independently operable means supported by said second stationary head operable concurrently for independently and concurrently entering the several chambers in said turret to work upon plastic material in said chambers simultaneously.

6. An injection moulding machine including in combination, a stationary head carrying a die member, a movable platen disposed beneath said stationary head and carrying a complementary die member and having means operably connected thereto for moving the platen relative to said stationary head, a second stationary head positioned above said first mentioned stationary head, a turret position between said stationary heads having a plurality of chambers therein, means supported by said second stationary head for operably cooperating with said chambers in said turret to work upon plastic material in said chambers, and means for moving said turret relative to said first mentioned stationary head to place the chambers carried by the turret in operating association with the die member carried by said first mentioned stationary head.

7. An injection moulding machine including in combination, a stationary head carrying a die member, a movable platen disposed beneath said stationary head and carrying a complementary die member and having means operably connected thereto for moving the platen relative to said stationary head, a second stationary head positioned above said first mentioned stationary head, a turret positioned between said stationary heads having a plurality of chambers therein, means supported by said second stationary head for operably cooperating with said chambers in said turret to work upon plastic material in said chambers, means for moving said turret relative to said first mentioned stationary head to place the chambers carried by the turret in operating association with the die member carried by said first mentioned stationary head, and means for sequentially indexing said chambers relative to a die member carried by said first mentioned stationary head.

8. An injection moulding machine including in combination, a stationary head carrying a die member, a movable platen disposed beneath said stationary head and carrying a complementary die member and having means operably connected thereto for moving the platen relative to said stationary head, a second stationary head positioned above said first mentioned stationary head, a turret positioned between said stationary heads having a plurality of chambers therein, reciprocable means carried by said second stationary head for moving said turret relative to said first stationary head to place the chambers carried thereby in operative association with the die member carried by said first stationary head, and additional reciprocable means carried by said second stationary head for moving operating members relatively to said chambers for working upon plastic material therein.

9. An injection moulding machine including in combination, a stationary head carrying a die member, a movable platen disposed beneath said stationary head and carrying a complementary die member and having means operably connected thereto for moving the platen relative to said stationary head, a second stationary head positioned above said first mentioned stationary head, a turret positioned between said stationary heads having a plurality of chambers therein, reciprocable means carried by said second stationary head for moving said turret relative to said first stationary head to place the chambers carried thereby in operative association with the die member carried by said first stationary head, said reciprocable means providing shaft means for rotatably supporting said turret and disposed in an off-center relationship relative to the axial center of said first head, said chambers in said turret being positioned thereon radially about said shaft means to dispose the chambers substantially on axial center of said first head for engaging the die member carried by said first head along the axial center of said head upon movement thereof by said turret, and additional reciprocable means carried by said second stationary head for moving operating members relatively to said chambers for working upon plastic material therein.

10. An injection moulding machine including in combination, a bed, a plurality of strain rods secured to said bed and extending upwardly therefrom, a stationary head supported by said strain rods intermediate the ends thereof and carrying a die member, a movable platen positioned between said stationary head and said bed, motor means carried by said bed for moving said platen relative to said stationary head to carry a die member supported thereby into engagement with the die member carried by said stationary head, a second stationary head secured upon said strain rods adjacent the upper end thereof, a turret positioned between said stationary heads having a plurality of chambers therein, reciprocable means carried by said second head for moving said turret relative to said first head for moving said chambers into engagement with the die member carried by said first head, means for feeding plastic material into said chambers, reciprocable heating means movable into operating relationship with said chambers for heating the plastic material therein, and a reciprocable injection ram carried by said second head for entering said chambers to eject material therefrom.

11. An injection moulding machine including in combination, a bed, a plurality of strain rods secured to said bed and extending upwardly therefrom, a stationary head supported by said strain rods intermediate the ends thereof and carrying a die member, a movable platen positioned between said stationary head and said bed, motor means carried by said bed for moving said platen relative to said stationary head to carry a die member supported thereby into engagement with the die member carried by said stationary head, a second stationary head secured upon said strain rods adjacent the upper end thereof, a turret positioned between said stationary heads having a plurality of chambers therein, reciprocable means carried by said second head for moving said turret relative to said first head for moving said chambers into engagement with the die member carried by said first head, means for feeding plastic material into said chambers, reciprocable heating means adapted to be connected to a source of high frequency current movable into operating relationship with said chambers for establishing a field of high frequency energy within said chambers for heating plastic material therein, and a reciprocable injection ram carried by said second head for entering said chambers to eject material therefrom.

12. An injection moulding machine including in combination, a stationary head carrying a die member, a movable platen disposed beneath said stationary head and carrying a complementary die member, means for moving said platen relative to said stationary head to clamp said die members together, a second stationary head positioned above said first mentioned stationary head, a turret positioned between said stationary heads having a plurality of chambers therein, a plurality of means supported by said second stationary head operable for independently entering said chambers to work upon plastic material therein, an injection chamber carried by said first stationary head, and means for moving said turret to place the chambers carried thereby in operative association with said injection chamber and thus with the die member carried by said first mentioned stationary head.

13. In an injection molding machine, a clamping station comprising a first stationary head and a platen movable theretoward for clamping a mold, a second stationary head spaced from said first head on the side thereof opposite said platen, a turret rotatably supported between said heads and having a plurality of circumferentially spaced chambers therein, means for indexing said turret to carry said chambers successively into operative alignment with said clamping station, and a plurality of circumferentially spaced working stations in alignment with the indexed positions of said chambers, said working stations including a precompacting station for compacting the plastic material in the chambers, a heating station for heating the plastic material in the chambers, and an injection station for ejecting the material from the chambers, said stations being operable on the material in said chambers in the order named and said injection station being in alignment with said clamping station.

14. In an injection molding machine, a clamping station comprising a first stationary head and a platen movable theretoward for clamping a mold, a second stationary head spaced from said first head on the side thereof opposite said platen, a turret rotatably supported between said heads and having a plurality of circumferentially spaced chambers therein, means for indexing said turret to carry said chambers successively into operative alignment with said clamping station, and a plurality of circumferentially spaced working stations in alignment with the indexed positions of said chambers, said working stations including a feed station for feeding a predetermined amount of material into said chambers, a precompacting station for compacting the plastic material in the chambers, a heating station for heating the plastic material in the chambers, and an injection station for ejecting the material from the chambers, said stations being operable on the material in said chambers in the order named and said injection station being in alignment with said clamping station.

HOWARD F. MacMILLIN.

REFERENCES CITED

The following references are of record in the file of this patent:

UNITED STATES PATENTS

| Number | Name | Date |
| --- | --- | --- |
| 1,597,803 | Kearney et al. | Aug. 31, 1926 |
| 2,280,771 | Dufour et al. | Apr. 28, 1942 |
| 2,356,338 | Misfeldt | Aug. 22, 1944 |
| 2,356,634 | Von Opel | Aug. 22, 1944 |

FOREIGN PATENTS

| Number | Country | Date |
| --- | --- | --- |
| 851,723 | France | Oct. 9, 1939 |